(12) United States Patent
Dupoiron

(10) Patent No.: US 7,124,780 B2
(45) Date of Patent: Oct. 24, 2006

(54) FLEXIBLE TUBULAR FLUID-TRANSFER CONDUIT

(75) Inventor: François Dupoiron, Barentin (FR)

(73) Assignee: Technip France(FR)

( * ) Notice: Subject to any disclaimer, the term of this patent is extended or adjusted under 35 U.S.C. 154(b) by 0 days.

(21) Appl. No.: 10/549,797

(22) PCT Filed: Mar. 16, 2004

(86) PCT No.: PCT/FR2004/000637

§ 371 (c)(1),
(2), (4) Date: Nov. 4, 2005

(87) PCT Pub. No.: WO2004/085900

PCT Pub. Date: Oct. 7, 2004

(65) Prior Publication Data

US 2006/0090808 A1    May 4, 2006

(30) Foreign Application Priority Data

Mar. 21, 2003    (FR) .................................. 03 03490

(51) Int. Cl.
*F16L 11/00* (2006.01)
(52) U.S. Cl. ...................... 138/134; 138/135; 138/129; 138/127; 138/137
(58) Field of Classification Search ................ 138/134, 138/135, 129, 130, 127, 137
See application file for complete search history.

(56) References Cited

U.S. PATENT DOCUMENTS

| | | | | |
|---|---|---|---|---|
| 4,492,089 A | * | 1/1985 | Rohner et al. ............... | 62/50.7 |
| 5,865,216 A | * | 2/1999 | Youngs ....................... | 138/135 |
| 6,446,672 B1 | * | 9/2002 | Kalman et al. ............. | 138/127 |
| 6,769,454 B1 | * | 8/2004 | Fraser et al. ................ | 138/127 |
| 6,843,278 B1 | * | 1/2005 | Espinasse ................... | 138/134 |
| 6,926,039 B1 | * | 8/2005 | Marion ....................... | 138/134 |

FOREIGN PATENT DOCUMENTS

| | | |
|---|---|---|
| EP | 0 937 932 A2 | 8/1999 |
| FR | 2828924 | 2/2003 |
| FR | 2846395 A1 * | 4/2004 |
| WO | WO 99/66246 | 12/1999 |
| WO | WO 00/17479 | 3/2000 |
| WO | WO 01/33130 | 5/2001 |
| WO | WO 01/51839 A1 | 7/2001 |

* cited by examiner

*Primary Examiner*—Patrick Brinson
(74) *Attorney, Agent, or Firm*—Ostrolenk, Faber, Gerb & Soffen, LLP

(57) ABSTRACT

A flexible tubular pipe having a pressure sheath, a pressure vault comprising at least one pressure-resistant armor, an intermediate sheath and at least one tensile armor layer. The inner annular space formed between the pressure sheath and the intermediate sheath comprises a layer which is used to drain the gases present in the annular space. The drainage layer is formed by a short-pitch winding of at least one long element having transverse drain holes or spaces which can drain gases between the successive turns of the winding. The transverse holes or spaces extend in a direction which is essentially transverse to the winding turns.

9 Claims, 3 Drawing Sheets

FLEXIBLE TUBULAR FLUID-TRANSFER CONDUIT

CROSS REFERENCE TO RELATED APPLICATION

The present application is a 35 U.S.C. §§ 371 national phase conversion of PCT/FR2004/000637, filed 16 Mar. 2004, which claims priority of French Application No. 03/03490, filed 21 Mar. 2003. The PCT International Application was published in the French language.

BACKGROUND OF TILE INVENTION

The present invention relates to a flexible tubular pipe of the type used for the production and transport of fluids in the offshore oil industry. More precisely, it relates to pipes designed to transport gas or multiphase fluids.

Pipes intended for transporting a fluid in the offshore oil industry have been described in many patents of the Assignee hereof, such as, for example, EP 0 937 932. They comply with, among others, API (American Petroleum Institute) Recommended Practice 17B. The pipes are formed by a combination of various layers, each intended to allow the flexible pipe to withstand the service and handling stresses, and also the stresses specifically related to their offshore use. In particular, these layers comprise polymeric sheaths and reinforcement layers formed by the winding of profiled wires, strips or composite wires, but they may also include the winding of various tapes between the various reinforcement layers. More particularly, they include at least one internal sealing sheath or pressure sheath designed to carry the transported fluid. The sealing sheath may be the innermost element of the pipe and that pipe is called a smooth-bore pipe or the sheath may be placed around a carcass formed, for example from the short pitch winding of an interlocked strip and that pipe is then called a rough-bore pipe. Reinforcement layers formed from the winding of metal or composite wires are generally placed around the pressure sheath and may comprise, for example:

- a pressure armor formed by the short-pitch winding of an interlocking profiled metal wire, said pressure armor being placed directly around the sealing sheath so as to take up the radial component of the internal pressure;
- optionally, a hoop formed by the short-pitch winding of a non-interlocking profiled wire placed on top of the pressure armor in order to contribute to the internal pressure resistance, the pressure armor, with or without said hoop, forming what is called the pressure vault of the pipe; and
- tensile armor plies formed by long-pitch windings of metal or composite profiled wires, said plies being intended to take up the axial component of the internal pressure and also the longitudinal stresses to which the pipe is subjected, such as for example the forces when laying said pipe.

An external polymeric sheath or protective sheath is generally provided on top of the abovementioned reinforcement layers. In certain cases, an intermediate polymeric sheath is also provided. This intermediate sheath may, for example, be an "anti-collapse" sheath generally placed around the pressure vault. The purpose of this intermediate sheath is in particular to prevent the sealing sheath and the optional carcass that it surrounds from collapsing when the annulus (the space lying between the sealing sheath and the external sheath) is exposed to excessive pressure compared with the internal pressure of the fluid that it transports. This may be the case when the external sheath is damaged and no longer fluidtight, and therefore the hydrostatic pressure prevails in the annulus. This anti-collapse intermediate sheath is generally present in the case of a smooth-bore pipe since the sealing sheath is all the more liable to collapse when it is not supported by a carcass.

In flexible production pipes, the transported fluid is often a multiphase fluid and contains gases such as $H_2S$, $CO_2$ or methane, which may diffuse through the pressure sheath. Gas diffusing through the sealing sheath of the flexible pipe increases the pressure in the annulus progressively with the diffusion. This pressure increase in the annulus may lead to problems of the internal sealing sheath collapsing, and this is so in particular in the case of a smooth-bore pipe in which said sheath is not supported by a carcass. This is, for example the case when the pressure in the annulus becomes very much greater than the pressure inside the pipe, as during a production shutdown or under certain particular conditions in service. Provision is also made for the gases present in the annulus to drain away in order to reduce the pressure therein. The gases drain away through and along the tensile armors toward a drainage valve generally located at a terminal end-fitting of the flexible pipe.

In the case of a smooth-bore pipe, the intermediate sheath located on top of the pressure vault prevents gas drainage into the tensile armor ply. Gas drainage therefore has to take place inside the pressure vault, but such a solution cannot be envisaged as it is very difficult for the gas in a layer such as the pressure vault, the winding angle of which is close to 90°, to be drained away effectively. Thus, smooth-bore flexible pipes are not used for transporting multiphase fluids or gases and are exclusively reserved for water injection lines, for which lines there is no gas diffusion problem. Thus, only rough-bore pipes are used for producing production lines, although these structures are more costly owing to the presence in particular of an additional expensive metal layer. Furthermore, the geometry of this layer is unfavorable for draining of the transported fluid.

Thus, there exists a real need for a low-cost structure of the smooth-bore type that can be used to transport gases or multiphase fluids. To try to satisfy this need, solutions have been proposed that consist in draining the gas closest to the internal pressure sheath. International Patent application WO 01/33130 describes a flexible pipe whose internal sheath has grooves in its external surface, said grooves being designed to drain away the gas between said sheath and the pressure vault. In the Assignee's patent application FR 01/11135 (not yet published), the internal pressure sheath is formed in two layers (double sheath) and the gas is drained away between the two sheaths in longitudinal grooves provided for this purpose. However, these solutions are very complicated to implement, especially because of problems due to creep of the thermoplastics used to produce the sheaths.

Another application (WO 99/66246), relating to bonded-type flexible pipes, mentions the flow of a liquid or gas above the pressure vault in an open or partly open space. However, there is no mention or even a suggestion of any solution to the problem of overpressure in the annulus due to gas diffusing through the pressure sheath.

In another patent (EP 0 937 932), the Assignee has disclosed a pipe with a structure that includes two tensile armor pairs and an intermediate sheath lying between the external armor pair and the internal armor pair, it being possible for such structure to be a smooth-bore structure. In such a structure the gas present in the internal annulus (the space lying between the internal sheath and the intermediate sheath) is drained away into the inner tensile armor pair, which has a lay angle of between 30 and 55°. However, this proposed solution does not make it possible to produce a low-cost smooth-bore pipe that can be used in production, especially because of the four tensile armor plies for the pipe, which increase its cost.

Moreover, whatever the type of pipe used (smooth-bore or rough-bore), the problem of gas diffusion means that the metal elements of the structure (pressure vault and tensile armors) that are located in the annulus must in particular be resistant to $H_2S$. This entails a higher cost due to the particular treatments that they undergo, and the mechanical properties obtained remain modest.

SUMMARY OF THE INVENTION

The objective of the present invention is therefore to remedy the aforementioned drawbacks of the structures of the prior art by proposing a flexible pipe that can be used for transporting gases or multiphase fluids.

According to its main feature, the flexible tubular pipe intended for the transport of fluid in the field of offshore oil production is of the type comprising at least, from the inside outward, a pressure sheath, a pressure vault comprising at least one pressure-resistant armor, an intermediate sheath and at least one tensile armor ply, and is characterized in that it includes, in the internal annular space, formed between the pressure sheath and the intermediate sheath, a draining layer that allows the gases present in this annular space to be drained away and in that said draining layer is formed by the short-pitch winding of at least one elongate element that includes transverse drainage spaces or recesses that allow the gases to drain away between the successive turns of the winding in a direction approximately transverse to said turns, that is to say in the longitudinal direction corresponding to the axis of the flexible pipe.

According to complementary features of the invention, the elongate element may consist of a profiled wire or a preformed metal strip, or it may be produced entirely or partly from a polymer material.

In one embodiment, the draining layer is advantageously formed by a hoop placed around the pressure-resistant armor and, in another embodiment, the lay angle of the elongate element relative to the axis of the pipe is advantageously greater than 70°.

In one embodiment, the transverse recesses are positioned along the elongate element so as to be at least partly aligned with another respective recess in the elongate element located in the touching turn, once the winding has been carried out. It may be noted that the elongate element may also have a longitudinal space in its profile in order to allow the gas to flow within any one turn.

In one embodiment, the draining layer is formed from two elongate elements of different profiles.

DESCRIPTION OF PREFERRED EMBODIMENTS

Figure 3:
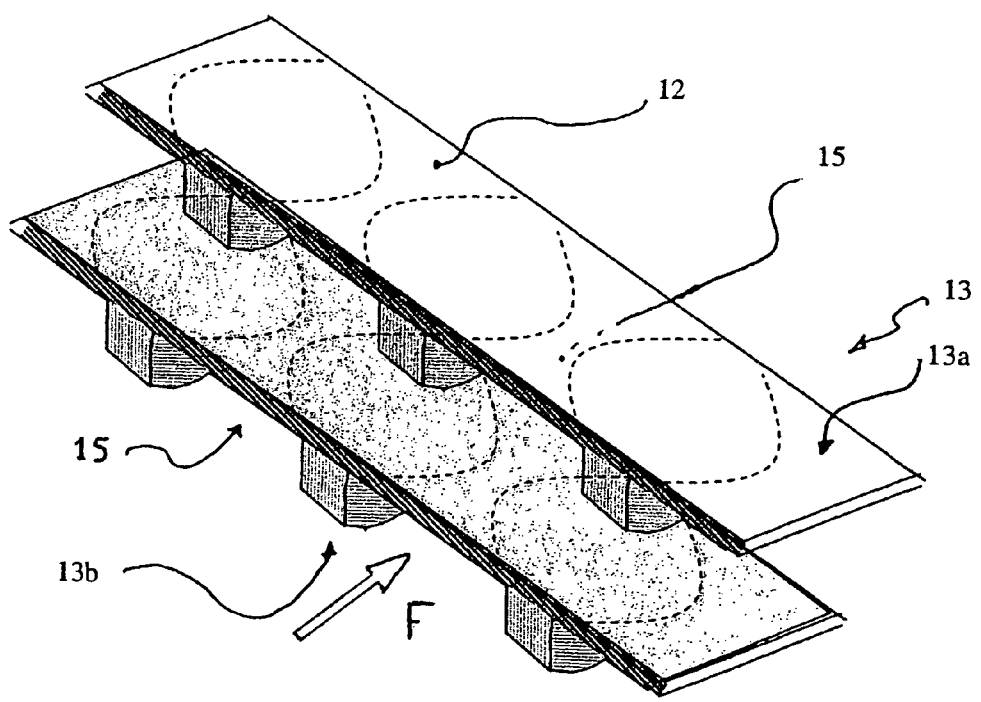
FIG. 3 shows schematically, opened out flat and in perspective, the winding that forms the draining layer of the first embodiment of a smooth-bore flexible pipe of the invention.
Figure 4:
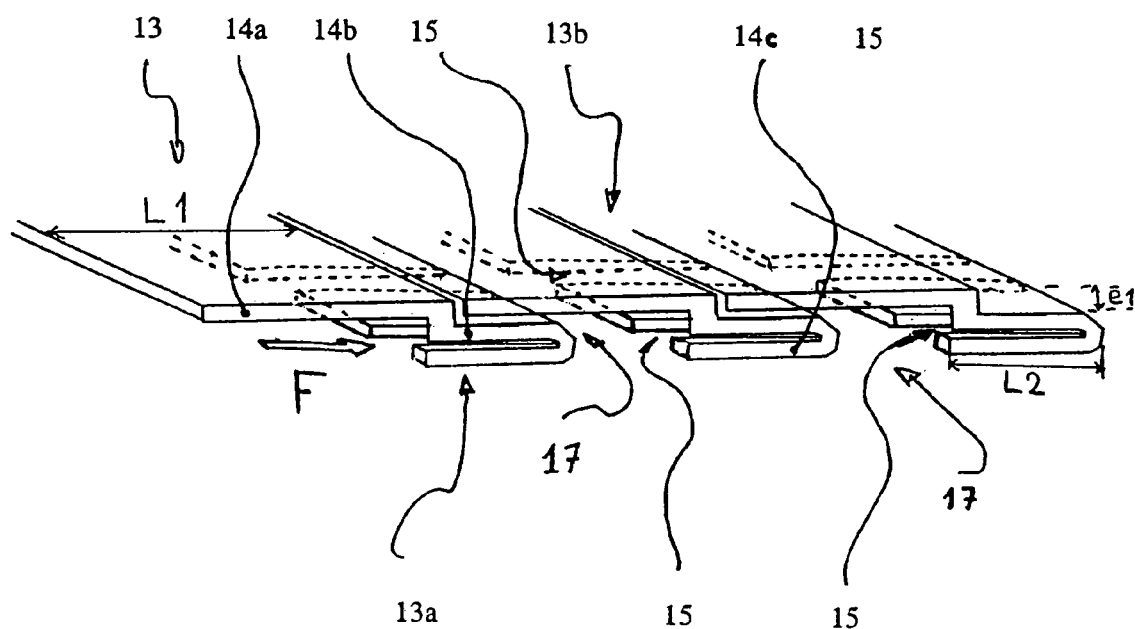
FIG. 4 illustrates, in a view similar to FIG. 3, a second embodiment of the draining layer.
Figure 5:
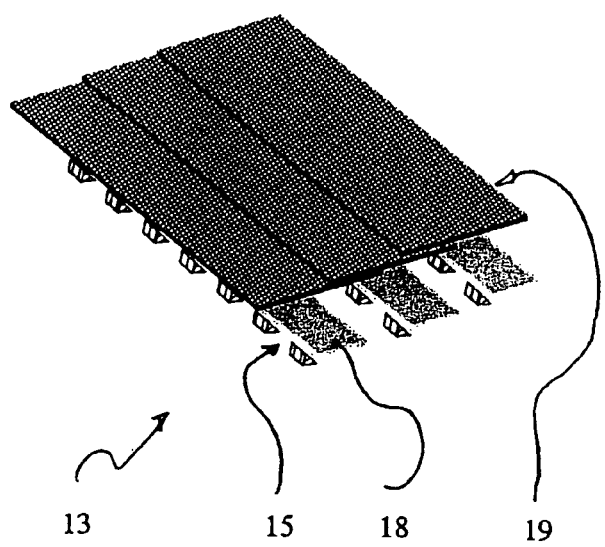
FIG. 5 illustrates, in a view similar to FIG. 3, a third embodiment of the draining layer.

To make it easier to understand FIGS. 3 to 5, the winding that forms the draining layer is shown in one plane.

The flexible tubular pipe 1 of the invention is of the type intended for offshore oil production, such as those defined by Recommended Practices API 17B and API 17J. It consists of a combination of unbonded constituent layers comprising polymeric sheaths and reinforcement layers or armors, it being possible for said layers, if required, to be separated by windings of various tapes intended to prevent the sheaths from creeping or intended to form, for example a thermal insulation.

Figure 1:
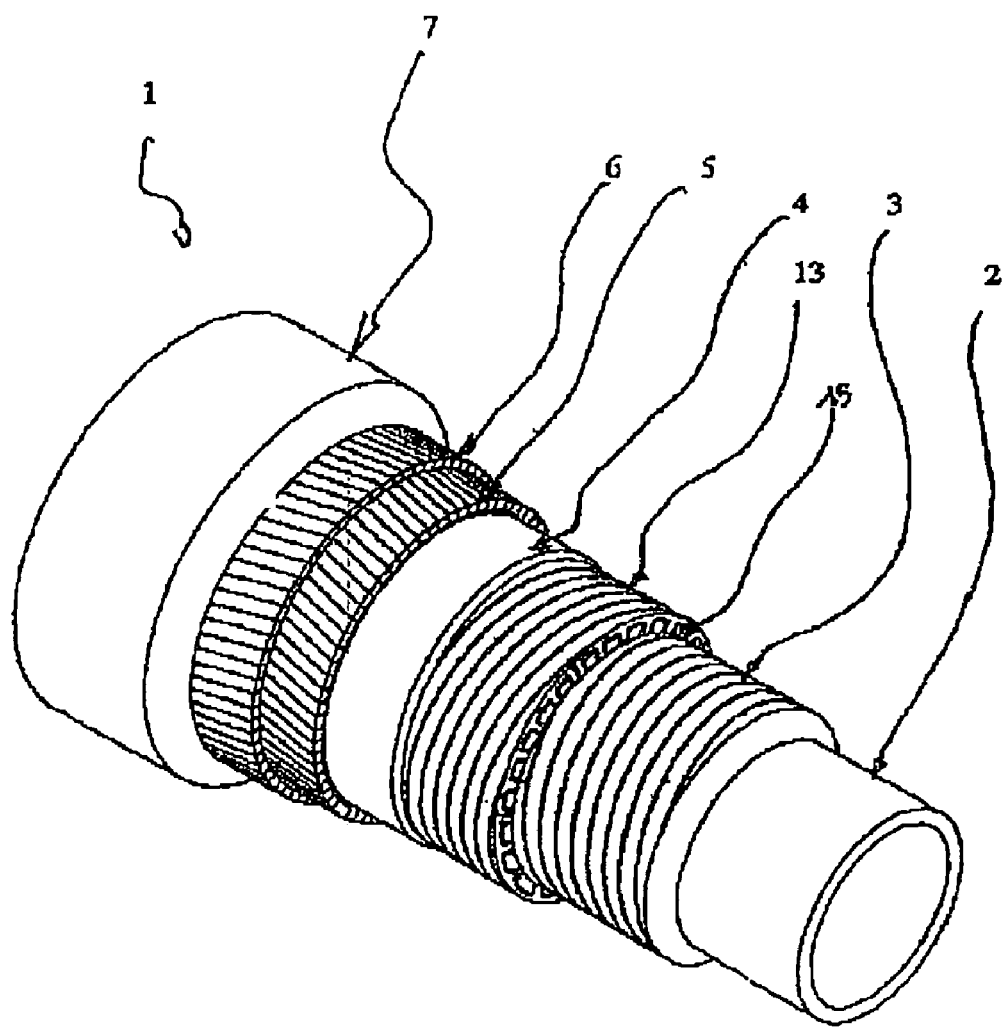
FIG. 1 shows schematically, in perspective, a smooth-bore flexible pipe of the invention and its various layers.
Figure 2:
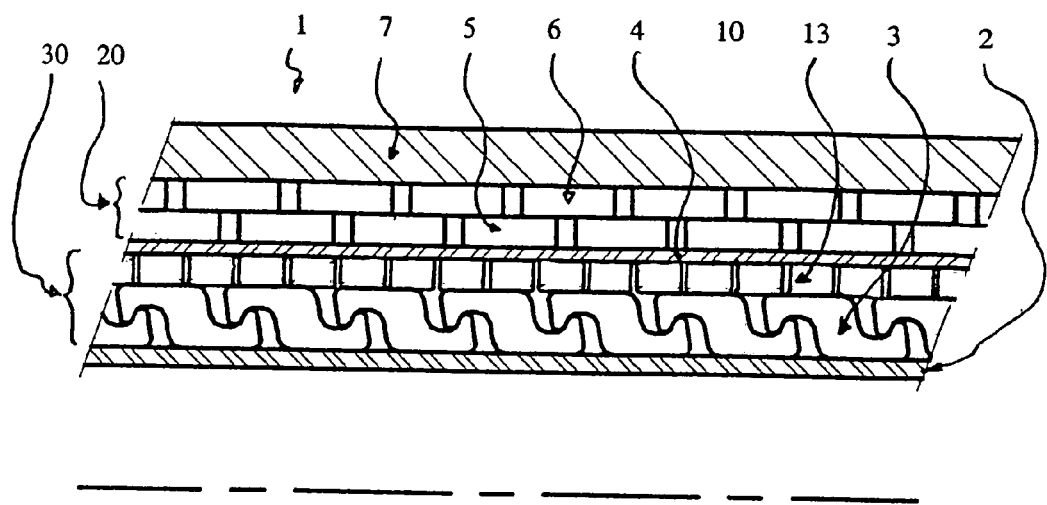
FIG. 2 shows, in longitudinal section, a first embodiment of a smooth-bore flexible pipe of the invention.

In the embodiment of the invention illustrated in FIGS. 1 to 3, the flexible pipe, bearing the general reference 1, is of the unbonded type and of the smooth-bore type, the innermost element being formed by a sealing sheath or pressure sheath 2. This sheath 2 is generally obtained by extrusion and has the function of sealing the bore in which the fluid flows and of withstanding the radial component of the internal pressure exerted by said fluid by means of the pressure vault that covers it.

This pressure vault generally comprises at least one pressure resistant armor 3 formed, for example by the short-pitch winding of an interlocking profiled metal wire and intended, together with the pressure sheath that it covers, to withstand the internal pressure. The term "short-pitch winding" is understood to mean a winding with a lay angle relative to the longitudinal axis of the pipe that is greater than 70° and advantageously greater than 80°. It goes without saying that the pressure vault may also include a hoop 13 intended to reinforce the resistance of said vault to the internal pressure. The pipe also includes what are called tensile armor plies 5, 6 wound with a long pitch and intended to take up the longitudinal forces to which the pipe may be subjected (longitudinal component of the pressure or laying forces, for example). The flexible pipe 1 also includes an external protective sheath 7 intended to protect the reinforcement layers 3, 13, 5, 6 located in the annular space formed between it and the internal sheath.

According to the invention, the flexible pipe 1 includes an intermediate sheath 4 in the form of an anti-collapse sheath. This sheath defines two annular spaces, an "internal" annulus 30, located between it and the internal sealing sheath 2, and an "external" annulus 20 between it and the external sheath 7. This intermediate sheath 4 is intended in particular to reduce the risks of the sealing sheath 2 collapsing when the external sheath is damaged and when, for example, the external annulus 20 is subjected to the hydrostatic pressure. It is thus intended to withstand this pressure by means of the layer on which it bears (the pressure vault), preventing the hydrostatic pressure from being applied directly on the sealing sheath 2.

According to the invention, the flexible pipe 1 includes a layer intended to allow the gases diffusing through the pressure sheath 2 to drain away into the internal annulus 30. Advantageously, this layer is placed between the pressure sheath 2 and the anti-collapse sheath 4 so as to drain away the diffusion gases within the internal annulus 30. This layer is formed from the short-pitch winding of at least one elongate element 12, 14, 18, 19 that has transverse draining spaces or recesses 15 (see FIG. 1) that allow the gas to drain away in a direction transverse to the turn that it forms in the winding. The recesses are positioned along the elongate element so as to provide a continuous draining path between the successive turns once the winding has been carried out.

Preferably, the distribution of the transverse recesses in the elongate element is calculated so that the recesses in two successive turns of said winding are at least partly in alignment. Thus, these spaces promote the drainage of gas transverse to the longitudinal axis of the short-pitch-wound elongate element, that is to say they promote the drainage of gas in the internal annulus substantially along the longitudinal direction of the pipe.

As the embodiment in FIG. 3 illustrates, and as also seen in the embodiment in FIG. 1. the profile of the elongate element has transverse spaces or slots 15 regularly distributed longitudinally along the elongate element so that, once the winding has been carried out, when these spaces are partly contiguous in the successive turns forming the layer in question, channels are formed that allow drainage in an approximately longitudinal direction F within the layer. These channels allow the gas to flow transversely through the turns that the elongate element forms once wound. Thus, contrary to the various solutions proposed in the abovementioned prior art, the gas is not drained along the elongate element 12 in the gaps or in the longitudinal slots positioned along said element, but is drained in a direction F approximately transverse to the winding. Thus, thanks to the invention, it becomes possible for effective drainage of the gas to take place within the internal annulus 30 in a layer of the pipe whose element is wound in a short pitch. It is thus possible to drain within a functional layer such as, for example, the hoop 13, that is to say within a layer that provides mechanical assistance to the resistance of the structure of the flexible pipe to the service or installation stresses that it is intended to withstand.

According to the invention, the layer wound with a short pitch, the elongate element of which has the transverse draining spaces for draining away the gas, may consist either of the pressure-resistant armor 3 or of the hoop 13, as in FIG. 1, or even optionally of a separate complementary layer of the pressure vault that is located in the internal annulus 30.

In the embodiment illustrated, the pipe includes, between the pressure sheath 2 and the intermediate sheath 4, a first, pressure-resistant armor layer 3 formed by the short-pitch winding of an interlocking profiled wire intended to withstand the radial stresses of the internal pressure in the pipe. This profiled wire has, for example, a Z profile, commonly called a zeta profile, but other profiles may also be used, such as T profiles or profiles of the wire-staple type (T interlocked by a U, etc.). It also includes a second, hoop layer 13 which is intended to reinforce the pressure-resistant armor 3 and which is formed from the short-pitch winding of at least one elongate element (for example, a profiled wire or a preformed metal strip). The hoop/pressure-resistant armor combination forms what it is convenient to call the pressure vault of the flexible pipe. In the first embodiment of the pipe illustrated in FIGS. 2 and 3, the hoop 13 is chosen to have contiguous transverse draining spaces 15 between its turns.

As shown in FIG. 3, the hoop 13 is formed by the short-pitch winding of a strip or profiled wire 12 that has, regularly distributed along its length, several transverse recesses or slots 15. These recesses are advantageously positioned along the strip so as to be at least partly in alignment with another recess in the strip once the winding has been carried out, in order to form transverse channels. To make it easier to form the transverse drainage channels through the successive turns, the recesses or slots 15 have a flared end. In this embodiment, the hoop 13 has the recesses on its internal face 13a in such a way that the external face 13b in contact with the intermediate sheath 4 has a cylindrical surface onto which the sheath may be extruded without any risk of blocking the transverse recesses. The hoop 13 thus produced forms a reinforcement layer for the pressure armor 3, which makes it possible not only to withstand the radial forces of the internal pressure but also to transfer the compressive forces to said pressure armor during installation of the pipe.

In another embodiment illustrated in FIG. 4, the hoop 13 is formed by the winding of a profiled strip 14. It may be noted that the strip 14, which has transverse recesses 15, may also be provided with a longitudinal space 17 which, once the winding has been carried out, promotes the flow of gas within any one turn. Thus, FIG. 4 shows a hoop 13, the elongate element of which is a preformed metal strip 14 whose cross section is formed from an upper staircase-shaped part, comprising a left-hand part 14a of width L1 extended by a right-hand part 14b of width L2, said right-hand part being extended by a lower part 14c, of width approximately equal to L2, folded back underneath said right-hand part. The left-hand part 14a and the right-hand part 14b are advantageously separated by a height e1 corresponding approximately to the thickness of the strip used to produce the profile so that the right-hand part can be entirely covered by the left-hand part of the next turn during winding with touching turns. The transverse recesses 15 are produced in the bent-over lower part 14c. By producing a strip whose width L1 is greater than the width L2, a longitudinal space 17 is made in the plane of each turn beneath the left-hand part of the profile. Consequently, the transverse recesses between two consecutive turns need not be aligned in order to provide a continuous drainage path, or else they may be in less strict alignment.

In embodiments that are not shown, the draining layer may be positioned beneath the pressure armor 3 formed by the interlocking profiled wire. In this case, the draining recesses would be advantageously positioned on the external face of the winding so as to present a cylindrical internal surface around the pressure sheath 2.

According to the embodiment illustrated in FIG. 5, the specific draining layer is produced by the short-pitch winding of two combined elongate elements, a notched wire or profiled bent strip 18 onto which a flat strip 19 is wound.

The nature of the material used to form the elongate element having the transverse draining recesses may be of any type. In particular, it is possible to use metal elongate profiles, such as profiled wires or profiled strips. It is also possible to envisage using polymer materials or polymer/metal hybrid structures in order to lighten the structure.

According to the preferred embodiments of the invention that have been illustrated, the flexible pipe is of the smooth-bore type and has a sealing sheath as innermost element. However, the invention may also be applicable in a rough-bore pipe in which the innermost element is a carcass. In this case, the specific draining layer allows the gas that diffuses through the pressure sheath to drain away within an "internal" annulus where the pressure vault is located, whereas the intermediate sheath defines an "external" annulus where the tensile armor plies are located, into which external annulus no gas coming from the transported fluid can diffuse.

Advantageously, this particular arrangement makes it possible to produce a rough-bore pipe, of which the tensile armors may be produced from a material without taking into account the NACE criteria regarding resistance of said material to corrosion in an $H_2S$ environment.

The invention claimed is:

1. A flexible pipe for the transport of fluid comprising at least, from its inside outward, a pressure sheath, a pressure vault comprised of at least one pressure-resistant armor, an intermediate sheath, at least one tensile armor ply;
   an internal annular space defined between the pressure sheath and the intermediate sheath;
   a draining layer in the annular space and that allows gases present in annular space to be drained away, the draining layer being formed by a short-pitch winding of at least one elongate element that includes drainage spaces or recesses extending transversely of the winding that allow gases to drain away between successive turns of the winding and in a direction approximately transverse to a direction of winding of the turns.

2. The flexible tubular pipe as claimed in claim 1, wherein the elongate element is a profiled wire.

3. The flexible tubular pipe as claimed in claim 1, wherein the elongate element forming the draining layer comprises a preformed metal strip.

4. The flexible tubular pipe as claimed in claim 1, wherein the draining layer is formed by a hoop surrounding the pressure-resistant armor.

5. The flexible tubular pipe as claimed in claim 1, wherein the elongate element of the draining layer has a lay angle greater than 70°.

6. The flexible tubular pipe as claimed in claim 1, wherein the elongate element forming the draining layer includes transverse recesses distributed longitudinally for enabling each recess to be at least partly aligned with another recess in the element when the elongate element has been wound, thereby forming transverse drainage channels along the aligned recesses.

7. The flexible tubular pipe as claimed in claim 1, wherein the elongate element has a profile including a longitudinal space for allowing gas to flow within any one turn of the elongate element.

8. The flexible tubular pipe as claimed in claim 1, wherein the elongate element forming the draining layer is made at least partly of a polymer material.

9. The flexible tubular pipe as claimed in claim 1, wherein the draining layer is formed by winding of two different ones of elongate elements.

* * * * *